United States Patent
Fournier

(10) Patent No.: US 8,302,553 B2
(45) Date of Patent: Nov. 6, 2012

(54) 3D INSTRUMENT CLUSTER

(75) Inventor: Joel Fournier, Cergy (FR)

(73) Assignee: Johnson Controls Technology Company, Holland, MI (US)

( * ) Notice: Subject to any disclaimer, the term of this patent is extended or adjusted under 35 U.S.C. 154(b) by 481 days.

(21) Appl. No.: 11/660,421

(22) PCT Filed: Jul. 27, 2005

(86) PCT No.: PCT/FR2005/001959
§ 371 (c)(1),
(2), (4) Date: Nov. 14, 2008

(87) PCT Pub. No.: WO2006/024748
PCT Pub. Date: Mar. 9, 2006

(65) Prior Publication Data
US 2009/0078190 A1    Mar. 26, 2009

(30) Foreign Application Priority Data
Aug. 18, 2004  (FR) ...................... 04 08952

(51) Int. Cl.
  *G01D 11/24* (2006.01)
  *G01D 11/28* (2006.01)
  *G01D 13/02* (2006.01)
(52) U.S. Cl. .................. 116/334; 116/286; 116/305
(58) Field of Classification Search .................. 116/62.1, 116/62.2, 62.3, 62.4, 286, 287, 288, 302, 116/305, 334; 368/223, 226, 227
See application file for complete search history.

(56) References Cited

U.S. PATENT DOCUMENTS

| | | | |
|---|---|---|---|
| 4,055,141 A * | 10/1977 | Homs | 116/292 |
| 4,875,433 A * | 10/1989 | Tsukamoto | 116/335 |
| 5,130,548 A * | 7/1992 | Sano et al. | 250/461.1 |
| 6,318,173 B1 * | 11/2001 | Pearl | 73/431 |
| 6,915,758 B2 * | 7/2005 | Nakagawa et al. | 116/286 |
| 2003/0116079 A1 * | 6/2003 | Sugiyama et al. | 116/305 |
| 2003/0210535 A1 | 11/2003 | Gaides | |
| 2006/0087826 A1 * | 4/2006 | Anderson, Jr. | 362/23 |

FOREIGN PATENT DOCUMENTS

| | | |
|---|---|---|
| DE | 44 07 855 A1 | 8/1995 |
| EP | 0 964 253 A1 | 12/1999 |
| FR | 2 715 614 | 8/1995 |
| FR | 2760414 A1 * | 9/1998 |
| JP | 08014950 A * | 1/1996 |
| JP | 10267700 A * | 10/1998 |

(Continued)

OTHER PUBLICATIONS

International Search Report for PCT/FR2005/001959, date of mailing May 3, 2006, 3 pages.

*Primary Examiner* — R. A. Smith
(74) *Attorney, Agent, or Firm* — Foley & Lardner LLP

(57) ABSTRACT

An instrument panel having at least one needle indicator comprising a dial of indicating characters supported by a first faceplate, an indicating needle and a motor for rotating the needle along the dial. The instrument panel includes a second faceplate for supporting other indicating characters, such that the indicating needle is configured to lie between the two faceplates. The faceplates are screen-printed flat before being shaped in relief.

12 Claims, 1 Drawing Sheet

FOREIGN PATENT DOCUMENTS

| | | | | |
|---|---|---|---|---|
| JP | 2001091435 A | * | 4/2001 | |
| JP | 2003021544 A | * | 1/2003 | |
| JP | 2003237413 A | * | 8/2003 | |
| JP | 2003247871 A | * | 9/2003 | |
| JP | 2003287447 A | * | 10/2003 | |
| JP | 2006258435 A | * | 9/2006 | |
| JP | 2007309837 A | * | 11/2007 | |
| JP | 2009008488 A | * | 1/2009 | |
| WO | WO 03/016086 A1 | | 2/2003 | |

* cited by examiner

3D INSTRUMENT CLUSTER

CROSS REFERENCE TO RELATED APPLICATIONS

The present Application claims the benefit of priority to the following International Application: PCT Patent Application No. PCT/FR2005/001959 titled "Instrument panel having two faceplates and method of forming a faceplate for the instrument panel" filed on Jul. 27, 2005 (which is incorporated by reference in its entirety).

FIELD

The application relates to an instrument panel with at least one indicator having a dial supported by a faceplate, especially for a motor vehicle or any other means of locomotion.

BACKGROUND

A motor vehicle instrument panel generally comprises a number of indicators, for example a speedometer, an engine revolution counter, a fuel level indicator, and especially needle indicators.

The needle of an indicator, controlled and rotated by a motor, or movement, generally extends in front of a support bearing screen-printed indicator characters forming a dial (for example graduations and values). The indicator is thus mounted in a protective and screening hood, which supports a protective window.

The support for the screen-printed indicating characters bears the name "faceplate". It generally comprises a thick sheet of opaque or translucent plastic.

The Applicant has sought to provide a novel instrument panel offering many options in the arrangement of the indicating characters, especially the arrangement of the graduations with respect to the values denoting them, in rendering relief effects and in playing with transparency and opacity effects.

The related art only provides devices in which there are fewer options, these being limited to specific relief effects. Thus, for example, devices are known which have an indicating needle, rotated in front of a screen-printed faceplate formed in relief, which have a needle rotated to the rear of a flat faceplate, and which have a needle rotated at the front of a faceplate, with a protective window placed to the front and itself also having indicating characters. The alternatives offered to the designer of an indicator can therefore be summarized as giving a relief effect to a faceplate, playing with the arrangement of the faceplate with respect to the needle, or giving a protective window the function of a front window. These alternatives have limited application.

SUMMARY

The embodiments disclosed in this application relate to an instrument panel having at least one needle indicator comprising a dial of indicating characters supported by a faceplate, an indicating needle and a motor for rotating the needle along the dial, characterized in that it includes a second faceplate for supporting other indicating characters, the needle lying between the two faceplates.

In this case, indicating characters may be provided on both faceplates of the indicator, each individually providing potentialities inherent to their nature. This offers many options of attractive visual effects. In this regard, the instrument panel may even by referred to as a "universal" instrument panel.

Preferably, at least one of the two faceplates has structures in relief. Advantageously in this case, said faceplate having structures in relief is produced by screen printing flat, before being shaped in relief.

Again preferably, the dial is formed by a combination of indicating characters on said faceplate and said other indicating characters on said second faceplate.

Advantageously, the instrument panel includes illumination means located to the rear of the two faceplates.

Again advantageously, the second faceplate fulfils the function of a protective window.

The invention also relates to a method of forming a faceplate for the instrument panel presented above, in which instrument panel a faceplate is formed from a sheet of polycarbonate with a thickness between 0.3 and 0.5 mm, said method being characterized in that the faceplate is screen-printed flat and then shaped in relief, by cold forming or hot forming.

BRIEF DESCRIPTION OF THE FIGURES

The invention will be more clearly understood from the following description of two embodiments of the instrument panel according to the invention, with reference to the appended drawing in which.

DETAILED DESCRIPTION

Figure 1:
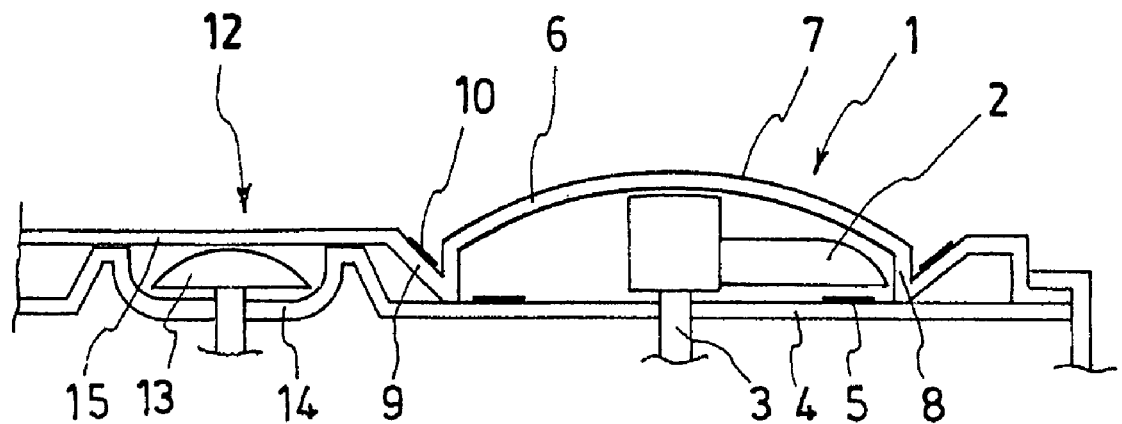
FIG. 1 shows a sectional view of a first embodiment of the instrument panel according to the invention.

Referring to FIG. 1, an instrument panel includes two indicators 1 and 12, the indicator 1 having a needle 2 rotated by a motor (not shown) via a spindle hub 3.

The needle 2 extends in front of a first faceplate 4, that portion of said faceplate 4 which is associated with the indicator 1 being plane. This first faceplate 4 here is partially translucent. It includes indicating characters 5 screen-printed on its front surface. Here, these are graduations 5 of a counting scale for the dial of the indicator 1.

Extending to the front of the first faceplate 4 and of the needle 2 is a second faceplate 6, which is also partially translucent. It is formed so as to extend in relief, in order to give the indicator 1 a particular visual effect. In this case, the second faceplate 6 is formed, in its portion associated with the indicator 1, so as to create an envelope in the form of a dome 7 to the front of the needle 2. A cylindrical wall 8 extends towards the rear from the annular edge of the dome 7 as far as the point where it contacts the front of the first faceplate 4, after which a wall 9 of frustoconical shape extends towards the front, said wall 9 bearing indicating characters, here screen-printed numerals 10, which give values to the graduations 5 that are located within the chamber of the dome 7 and form, in combination with said graduations, the dial of the indicator 1, the needle 2 of which indicates the values.

Here, both faceplates 4, 6 are back-lit, for example by light-emitting diodes (not shown), in a manner well known to those skilled in the art. The screen printing forming the graduations 5 and the numerals 10 may here be either opaque, so that the indicating characters appear as Chinese shadows, or translucent, with a different colour from the outline of the characters, so that they appear transparent, or they may be a combination of the two.

The second indicator 12, similar to the first, also comprises a needle 13, which here is a dome-shaped needle, an extension 14 of the first faceplate 4, located to the rear of the needle 13, and an extension 15 of the second faceplate 6, located to the front of the needle 13. The extension 14 of the first faceplate 4 is formed as a cup for housing the needle 13, the extension 15 of the second faceplate 6 being plane. The two indicators 1, 12 may be lit by the same illumination means.

In the preferred embodiment of the instrument panel, each of the faceplates 4, 6 is made of a relatively thin sheet of polycarbonate, in this case with a thickness between 0.3 and 0.5 mm. Such a sheet of polycarbonate is relatively flexible. The sheet is screen-printed flat, that is to say it lies in a plane and that the indicating characters 5, 10 are screen-printed thereon. Once the sheet has been screen-printed, it is shaped in relief. This forming operation may take place either cold or hot, constituting a thermoforming operation in the latter case. Cold forming is conceivable owing to the thinness of the sheet. One advantage of such a method of forming the faceplates 4, 6 is its low cost, since screen printing flat is much simpler than screen printing in relief. Consequently, the designer is completely free to give the faceplates 4, 6 any aesthetically or functionally useful shape in relief, on the one hand because the screen printing has already been applied and, on the other hand, because the thinness of the sheet gives it great forming flexibility.

In addition, it is possible, by giving a polycarbonate sheet an appropriate shape, to stiffen it. This thus applies, for example, to a polycarbonate sheet which is made in the form of a dome, as is the case here for the second faceplate 6 of the first indicator 1. Thus stiffened, the faceplate 6 can fulfil the function of a protective window, which is to protect the indicator, and especially the needle, from the outside. For this purpose, said front face 6 may additionally be treated with an anti-reflection coating. This therefore appears to be another advantage of the instrument panel. The faceplate function is not given to a protective window by screen-printing it, but, since the shape of such a protective window is simple, rigid and non-modifiable, the function of a protective window is given here to a faceplate, said protective window also having all the advantages of a faceplate, whatever its capability of being formed in relief or the possibility of screen-printing it in various colours, at the point where the indicating characters are or away from them.

It goes without saying that the protective window function of the faceplate 6 could be obtained more simply, that is to say without defining a shape whose constraints dictate the stiffness of the sheet, by using a thicker polycarbonate sheet than that used in the embodiment that has just been described. The thickness of the sheet then ensures its stiffness and therefore its function.

Figure 2:
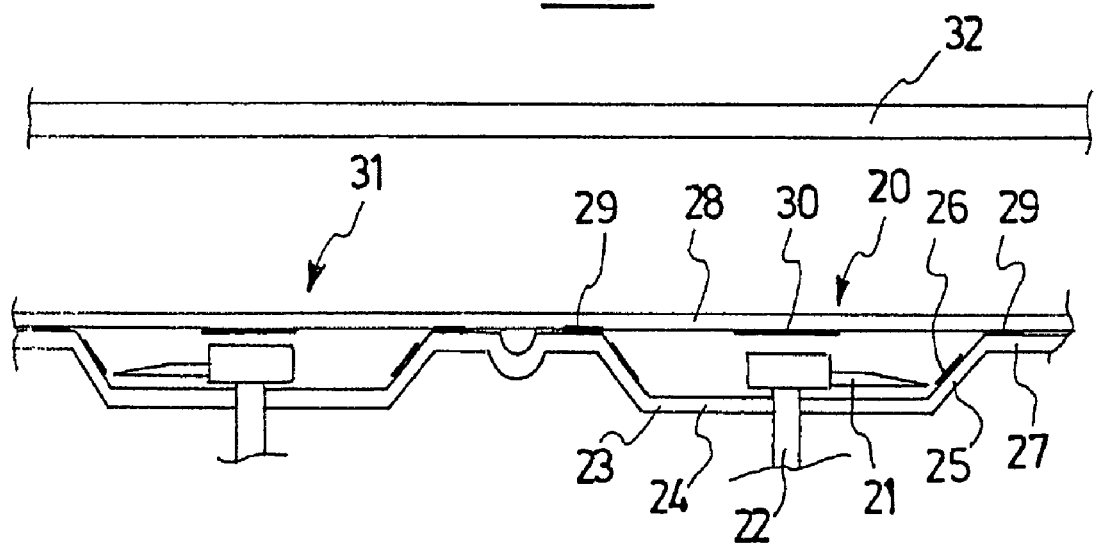
FIG. 2 shows a sectional view of a second embodiment of the instrument panel according to the invention.

FIG. 2 shows a second embodiment of the instrument panel according to the invention.

A first indicator 20 here has a needle 21, rotated by a motor via a spindle hub 22, which extends in front of a partially translucent first faceplate 23. This first faceplate 23 has a plane circular back wall 24, extending beneath the needle 21, a frustoconical wall 25 extending forwards from the edge of back wall 24, said wall 25 having indicating characters, here graduations 26 of a counting scale forming the dial of the indicator. Extending from the front edge of this frustoconical wall 25 is a plane wall portion 27 parallel to the back wall 24.

A partially translucent second faceplate 28 extends in front of the first faceplate 23 and the needle 21. This second faceplate 28 is plane and lies just in front of the plane wall portion 27 of the first faceplate 23. On its internal surface, it has indicating characters and numerals 29, forming, with the graduations, the dial of the indicator 20. It also includes a circular mask 30, screen-printed in line with the spindle hub of the needle 21 and concealing the central part of the needle 21.

In the same way as previously, the indicator 20 is back-lit. The appearance of the indicating characters is as described above.

The instrument panel shown in FIG. 2 includes a second indicator 31, identical to the first indicator 20, formed from the same faceplates 23, 28 and back-lit with the first indicator.

The faceplates 23, 28 are formed using the same method as that described above, namely screen printing flat followed by forming in relief, in respect of that face having structures in relief.

The instrument panel furthermore includes here a protective window 32, which lies to the front of the two indicators 20, 31. The two faceplates 23, 28 therefore fulfil here only a faceplate function. The advantage of this embodiment is the complete freedom for the designer to arrange the faceplates 23, 28 to his taste, without shape constraints linked with the stiffness of the sheet, the protection function being independently fulfilled by the protective window.

Thanks to the invention, many options in the way the dial of an indicator appears are offered to a designer, who can easily design the forming of the two faceplates so as to give them relief effects, independently of each other or linked to each other, the arrangement of the screen-printed indicating characters, on one and the same faceplate or, relative to one another, on both faceplates, especially graduations in relation to numerals demoting them, and also the arrangement of other indications or features, such as concealments, abbreviations, etc.

The universal nature of the indicator according to the invention clearly stems from studying the many advantages, whether correlated or uncorrelated, that have been raised.

The invention has only been described in relation to back-lighting, but front lighting could be added, for example with phosphorescent indicating characters.

In addition, the screen-printed markings may be applied on one side of the faceplates or on the other, which may also be in different colours, at least in some of their portions.

Furthermore, physical features other than screen-printed features may be added to the faceplates. For example, the faceplate lying in front of the needle may include a solid cover for concealing the central part of the needle, or on the contrary a recess allowing it to project from its surface.

Both the faceplates described are translucent. However, that one located to the rear of the needles could be opaque while that one located to the front could be translucent, the lighting then being provided either to the front of the faceplates or between them.

It goes without saying that more than two faceplates may be provided.

The invention claimed is:

1. An instrument panel having at least one needle indicator comprising:
    a first faceplate that is partially translucent and supports a dial of screen-printed indicating characters;
    an indicating needle and a motor for rotating the needle along the dial; and
    a second faceplate that is one of partially translucent and opaque and supports other screen-printed indicating characters, wherein the indicating needle is configured to lie between the first and second faceplates,
    wherein the screen-printed indicating characters supported by the first faceplate comprise a first format and the other screen-printed indicating characters supported by the second faceplate comprise a second format that is different from the first format, wherein an illumination means is located to the rear of the first and second faceplates, and wherein certain indicating characters are produced by opaque screen printing so as to appear as Chinese shadows.

2. An instrument panel according to claim 1, wherein at least one of the first and second faceplates is configured to include structures in relief.

3. An instrument panel according to claim 2, wherein the at least one of the first and second faceplates configured to have structures in relief, is produced by screen printing flat, before being shaped in relief.

4. An instrument panel according to claim 1, wherein the dial is formed by a combination of indicating characters on the first faceplate and indicating characters on the second faceplate.

5. An instrument panel according to claim 1, wherein at least one of the first and second faceplates is made of a sheet of polycarbonate with a thickness ranging between 0.3 and 0.5 mm.

6. An instrument panel according to claim 1, wherein the first and second faceplates are formed from a sheet of polycarbonate with a thickness of between 0.3 and 0.5 mm, and wherein the first faceplate is formed so as to be stiffened and function as a protective window.

7. A method of forming a first and second faceplate of the instrument panel of claim 1, wherein each of the first and second faceplates is formed from a sheet of polycarbonate with a thickness between 0.3 and 0.5 mm, wherein each of the first and second faceplates are screen-printed flat and then shaped in relief, by cold forming or hot forming.

8. A method according to claim 7, in which the first faceplate is formed so as to be stiffened and function as a protective window.

9. An instrument panel according to claim 1, wherein one of (i) the first faceplate has a frustoconical portion bearing the screen-printed indicating characters and (ii) the second faceplate has a frustoconical portion bearing the other screen-printed characters.

10. An instrument panel according to claim 1, wherein the screen-printed indicating characters supported by the second faceplate comprise graduations and the other screen-printed indicating characters supported by the first faceplate comprise numbers.

11. An instrument panel having at least one needle indicator comprising:
a first faceplate that is partially translucent and supports a dial of screen-printed indicating characters;
an indicating needle and a motor for rotating the needle along the dial;
a second faceplate that is one of partially translucent and opaque and supports other screen-printed indicating characters, wherein the indicating needle is configured to lie between the first and second faceplates; and
a protective window that is transparent and is in front of the first faceplate and the second faceplate,
wherein the screen-printed indicating characters supported by the first faceplate comprise a first format and the other screen-printed indicating characters supported by the second faceplate comprise a second format that is different from the first format.

12. An instrument panel according to claim 11, wherein certain indicating characters are produced by translucent screen printing.

* * * * *